(12) United States Patent
Degaray et al.

(10) Patent No.: US 11,198,567 B2
(45) Date of Patent: Dec. 14, 2021

(54) SYSTEM AND PROCESS FOR DELIVERING BUILDING MATERIALS

(71) Applicant: PUMP TRUCK INDUSTRIAL LLC, Port Washington, NY (US)

(72) Inventors: Stephen K. Degaray, Huntington, NY (US); Peter Larsen, Farum (DK)

(73) Assignee: PUMP TRUCK INDUSTRIAL LLC, Port Washington, NY (US)

( * ) Notice: Subject to any disclaimer, the term of this patent is extended or adjusted under 35 U.S.C. 154(b) by 0 days.

(21) Appl. No.: 15/674,789

(22) Filed: Aug. 11, 2017

(65) Prior Publication Data

US 2017/0369258 A1    Dec. 28, 2017

Related U.S. Application Data

(63) Continuation of application No. 13/831,989, filed on Mar. 15, 2013, now Pat. No. 9,738,461, which is a continuation-in-part of application No. 13/552,927, filed on Jul. 19, 2012, now abandoned, and a
(Continued)

(51) Int. Cl.
| | |
|---|---|
| *B65G 53/40* | (2006.01) |
| *B01F 15/02* | (2006.01) |
| *B28C 7/00* | (2006.01) |
| *B28C 9/04* | (2006.01) |
| *B28C 7/04* | (2006.01) |
| *F04B 15/02* | (2006.01) |

(52) U.S. Cl.
CPC .......... *B65G 53/40* (2013.01); *B01F 15/0216* (2013.01); *B28C 7/0038* (2013.01); *B28C 7/0418* (2013.01); *B28C 7/0422* (2013.01); *B28C 9/0454* (2013.01); *F04B 15/02* (2013.01); *Y10T 137/0318* (2015.04); *Y10T 137/6881* (2015.04); *Y10T 137/85978* (2015.04)

(58) Field of Classification Search
CPC ... B28C 7/0422; B28C 5/0875; B28C 7/0418; B01F 13/1002; B01F 13/1005
See application file for complete search history.

(56) References Cited

U.S. PATENT DOCUMENTS

| | | |
|---|---|---|
| 734,687 A | 7/1903 | Erter |
| 747,652 A | 12/1903 | Schillinger |
| 821,790 A | 5/1906 | Dorweiler |

(Continued)

FOREIGN PATENT DOCUMENTS

| | | |
|---|---|---|
| EP | 1 669 180 A2 | 6/2006 |
| JP | S63-175632 A | 7/1988 |

(Continued)

OTHER PUBLICATIONS

International Preliminary Report on Patentability, dated Sep. 22, 2009 in PCT/US08/053519 filed on Feb. 8, 2008, 5 pages.
(Continued)

*Primary Examiner* — Elizabeth Insler
(74) *Attorney, Agent, or Firm* — Collard & Roe, P.C.

(57) ABSTRACT

A system and process for mixing and distributing building materials. This system and process can also include a way or a means for calibrating the mixing of these materials. This system and process can also include a system for tracking the materials that flow through the system, and for controlling the type of material used in the system.

12 Claims, 9 Drawing Sheets

Related U.S. Application Data continuation-in-part of application No. 11/726,011, filed on Mar. 20, 2007, now abandoned.

(60) Provisional application No. 61/509,749, filed on Jul. 20, 2011, provisional application No. 60/743,716, filed on Mar. 23, 2006.

(56) References Cited

U.S. PATENT DOCUMENTS

| | | | |
|---|---|---|---|
| 858,017 A | 6/1907 | Pence | |
| 921,480 A | 5/1909 | Stevens et al. | |
| 1,138,397 A | 5/1915 | Nesetril | |
| 1,233,198 A | 7/1917 | Davis | |
| 1,619,145 A | 3/1927 | McMillan | |
| 2,017,439 A | 10/1935 | Grayson | |
| 2,139,027 A | 12/1938 | McConnaughay | |
| 2,276,237 A | 3/1942 | Lowry | |
| 2,298,258 A | 10/1942 | Ziler | |
| 2,425,674 A | 8/1947 | Fleischmann | |
| 2,782,011 A | 2/1957 | Fitzgerald | |
| 2,929,658 A | 3/1960 | Killebrew | |
| 2,945,683 A * | 7/1960 | Martinson | E01C 19/1009 |
| | | | 366/22 |
| 2,945,684 A | 7/1960 | Soldini | |
| 3,050,159 A | 8/1962 | Paulus et al. | |
| 3,064,832 A | 11/1962 | Heltzel | |
| 3,072,388 A | 1/1963 | Ridley | |
| 3,251,484 A | 5/1966 | Hagan | |
| 3,305,222 A | 2/1967 | Foster | |
| 3,343,688 A | 9/1967 | Ross | |
| 3,828,949 A | 8/1974 | Spellman | |
| 3,967,815 A | 7/1976 | Backus et al. | |
| 4,089,509 A | 5/1978 | Morton et al. | |
| 4,185,923 A | 1/1980 | Bouette et al. | |
| 4,223,996 A | 9/1980 | Mathis et al. | |
| 4,298,288 A | 11/1981 | Weisbrod | |
| 4,322,167 A | 3/1982 | Hill | |
| 4,375,335 A | 3/1983 | Klein-Albenhausen | |
| 4,487,507 A | 12/1984 | Van Wyngaarden | |
| 4,506,982 A | 3/1985 | Smithers et al. | |
| 4,538,916 A | 9/1985 | Zimmerman | |
| 4,768,884 A * | 9/1988 | Elkin | B29B 9/04 |
| | | | 366/28 |
| 4,922,463 A | 5/1990 | Del Zotto et al. | |
| 5,044,819 A | 9/1991 | Kilheffer et al. | |
| 5,149,192 A | 9/1992 | Hamm et al. | |
| 5,152,605 A | 10/1992 | Yamada et al. | |
| 5,203,628 A | 4/1993 | Hamm | |
| 5,213,414 A | 5/1993 | Richard et al. | |
| 5,570,953 A | 11/1996 | DeWall | |
| 5,573,333 A | 11/1996 | Dahlman | |
| 5,590,976 A | 1/1997 | Kilheffer et al. | |
| 5,624,183 A | 4/1997 | Schuff | |
| 5,660,465 A | 8/1997 | Mason | |
| 5,730,523 A * | 3/1998 | Flood | B28C 7/02 |
| | | | 366/18 |
| 5,775,803 A | 7/1998 | Montgomery et al. | |
| 5,785,420 A | 7/1998 | Schuff | |
| 5,873,653 A | 2/1999 | Paetzold | |
| 5,893,639 A | 4/1999 | Tetoldini | |
| 6,224,250 B1 * | 5/2001 | Kreinheder | B28C 7/02 |
| | | | 360/16 |
| 6,309,570 B1 | 10/2001 | Fellabaum | |
| 6,488,088 B1 | 12/2002 | Kohli et al. | |
| 6,666,573 B2 | 12/2003 | Grassi | |
| 6,832,851 B1 | 12/2004 | Von Wilcken | |
| 6,876,904 B2 | 4/2005 | Oberg et al. | |
| 6,929,393 B1 | 8/2005 | Brock et al. | |
| 6,955,311 B2 | 10/2005 | Moro et al. | |
| 6,991,361 B2 * | 1/2006 | Flood | B28C 7/0486 |
| | | | 366/18 |
| 2002/0169517 A1 | 11/2002 | Hudelmaier | |
| 2004/0176876 A1 * | 9/2004 | Oberg | B01F 15/0479 |
| | | | 700/265 |
| 2006/0093536 A1 | 5/2006 | Selby | |
| 2006/0201396 A1 | 9/2006 | Smith | |
| 2007/0226089 A1 | 9/2007 | DeGaray et al. | |
| 2007/0257392 A1 | 11/2007 | Etherton | |
| 2009/0177313 A1 * | 7/2009 | Heller | B28C 5/146 |
| | | | 700/216 |
| 2009/0180348 A1 | 7/2009 | Long, Jr. | |
| 2010/0000442 A1 | 1/2010 | Ackerman | |
| 2012/0205400 A1 | 8/2012 | Degaray et al. | |
| 2013/0025706 A1 | 1/2013 | Degaray et al. | |
| 2013/0199617 A1 | 8/2013 | Degaray et al. | |
| 2016/0107132 A1 | 4/2016 | Igo et al. | |
| 2016/0221220 A1 | 8/2016 | Paige | |

FOREIGN PATENT DOCUMENTS

| | | |
|---|---|---|
| JP | 2005-213732 A | 8/2005 |
| KR | 2002-0011787 A | 2/2002 |
| KR | 2003-0027532 A | 4/2003 |
| KR | 10-0386683 B1 | 6/2003 |
| WO | 2008/115633 A1 | 9/2008 |
| WO | 2008/116006 A1 | 9/2008 |
| WO | 2011/008716 A2 | 1/2011 |
| WO | 2013/012984 A2 | 1/2013 |

OTHER PUBLICATIONS

International Preliminary Report on Patentability, dated Sep. 22, 2009 in PCT/US2008/057528 filed on Mar. 19, 2008, 6 pages.
Written Opinion of the International Searching Authority dated Jan. 29, 2013 in PCT/US2012/047295 filed on Jul. 19, 2012, 8 pages.
International Preliminary Report on Patentability of PCT/US2012/047295, dated Jan. 30, 2014.
Canadian Office Action in Canadian Application No. 2,767,762 dated Apr. 12, 2016.

* cited by examiner

SYSTEM AND PROCESS FOR DELIVERING BUILDING MATERIALS

CROSS REFERENCE TO RELATED APPLICATIONS

This application is a continuation application of Ser. No. 13/831,989 filed on Mar. 15, 2013, which is a continuation in part application of U.S. patent application Ser. No. 13/552,927 filed on Jul. 19, 2012, which is a non-provisional application that hereby claims priority under 35 U.S.C. 119e from provisional application Ser. No. 61/509,749 filed on Jul. 20, 2011. U.S. application Ser. No. 13/831,989 is a continuation in part application of application Ser. No. 11/726,011 filed on Mar. 20, 2007, that hereby claims priority under 35 U.S.C. 119e from provisional application Ser. No. 60/743,716 filed on Mar. 23, 2006, the disclosure of which is hereby incorporated herein by reference in its entirety.

BACKGROUND OF THE INVENTION

One embodiment of the invention relates to a system and process for delivering building materials. This type of device is capable of performing a continuous process of feeding materials to a building site in both a batch and continuous flow process.

SUMMARY OF THE INVENTION

One embodiment of the invention relates to a process for continuously feeding building materials to a building site.

This process comprises feeding a first type of material through a feeding system and then feeling a second type of material through the feeding system. This process also includes mixing said first type of material with a second type of material into a composite material. For example, the first type of material can be sand, while the second type of material can be a binder, such that the first and second types of material when mixed together form a building material such as cement or concrete.

This process can also include mixing a third type of material with the composite material.

This third type of material can be a liquid material such as water, a water chemical mixture or any other type of third material. A next step can include pumping the mixed material to a building site. This process further comprises the step of moving a test batch of at least one type of material through the feeding system to calibrate the feeding rate. Thus, for example, a test batch of sand or of binder can be first fed into the system. Alternatively, or in addition, this process can also comprise the step of calibrating the feeding system by moving a test batch of at least a second type material through the feeding system.

Once this first batch of material is fed through the system, the material which is not yet mixed into a composite can be recycled and re-introduced into the system. For example, this process can also include the step of re-feeding the previously fed test batch of material back into the feeding system. This process can also include the step of feeding the second type of test batch material back into the feeding system.

In at least one embodiment, the step of calibrating the feeding system comprises determining a first weight for a material to be mixed, moving the material through the feeding system, tracking the time for feeding the material through the system and then determining a second weight for the material to be mixed.

At least one embodiment of the invention can relate to a system for delivering building materials comprising a container, and a transport device coupled to the container, wherein the transport device is configured to be coupled to a vehicle. In this case, the transport device can in this or in any embodiment be a flat bed for a truck. In addition, the container can be in the form of a standard sized container for a standard sized truck such as an eighteen wheel truck.

Inside of the container there can be a first holding bin substantially disposed in the container. In addition, there can be a second holding bin substantially disposed in the container. There can be at least one feed tube coupled to the first holding bin. This feed tube can include a drive system to feed the material through the feed tube. The drive system be in the form of any known drive system, but in this case can be in the form of a screw drive system. There can be at least one other feed tube coupled to the second holding bin, and this other feed tube can also comprise a drive system. This type of drive system can be of any known drive system, such as in the form of a screw drive system. There can be at least one pre-mixer configured to receive materials from at least one of the feed tubes coupled to the first and second holding bins.

There can also be at least one continuous mixer, configured to receive an output of the pre-mixer and configured to hold the components from the pre-mixer.

In at least one embodiment, the transport device comprises a flat bed with a connection element configured to connect to the vehicle and wherein this vehicle comprises a motor vehicle.

This embodiment or other embodiments can also include a pre-mixer which further comprises mixing elements.

These said mixing elements of this pre-mixer can comprise paddles.

This continuous mixer is configured to receive a liquid with a mixed material from said pre-mixer.

This said continuous mixer further comprises mixing elements. These mixing elements of this continuous mixer can comprise paddles and/or screws.

This system can also include at least one scale configured to weigh at least one of the first holding bin and the second holding bin. This at least one scale is configured to material in the holding bin.

There can be at least one computer system, wherein the computer system is configured to read information from the at least one scale and determine an amount of material fed from at least one of the first holding bin and the second holding bin.

The system can also comprise an air pump, and a particulate holding bin. This air pump is coupled to at least one of the first holding bin and the second holding bin, and is configured to pump particulate away from at least one of the first holding bin and the second holding bin.

In addition, in at least one embodiment, there can be an additional water cooling system which can be in the form of an external water cooling system or an internal water cooling system.

In addition, in at least one embodiment there can be a system for tracking the usage of building materials as those building materials flow through the system. This system can include a log of all of the building materials that are entered into the system. One way to enter this information is through a scanner which scans a bar code tag or RFID tag of the system in order to record whether the material being used in the system is an authorized form of material. In this case, the logging of material can either be through the use of a barcode scanner, a nearfield scanner, a RFID scanner, a prepaid set of codes, or any other way to grant access to the use of the machine. The scanning or the codes can then provide temporary access to the machine to allow the machine to operate. The machine is then monitored through the use of a flow sensor which is configured to determine the amount of material that is dispensed from the system.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
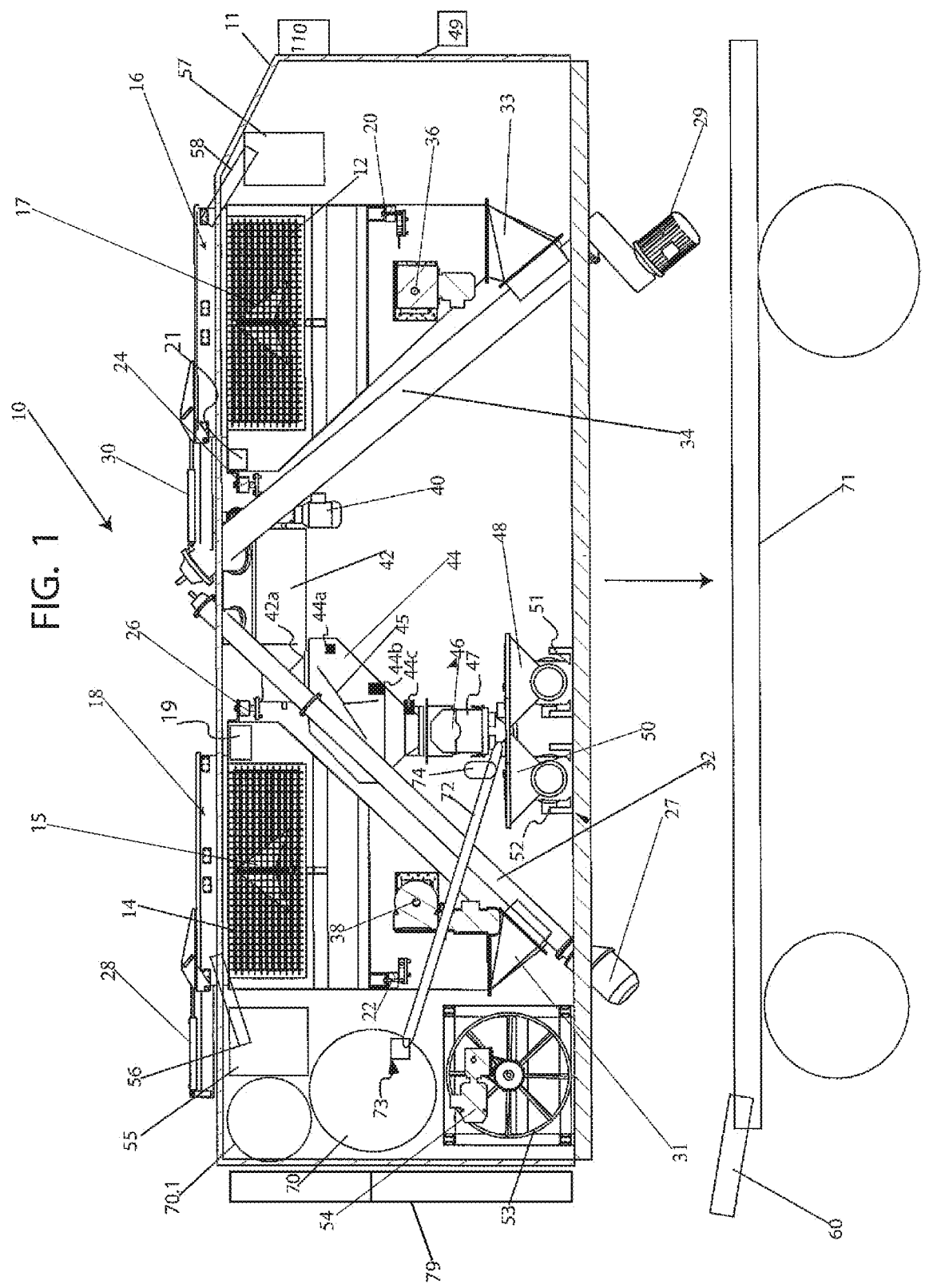
FIG. 1 is a side cross-sectional view of one embodiment of the device.

At least one embodiment of the invention can relate to a system 10 for delivering building materials comprising a container 11, a transport device coupled to the flat bed 71, wherein the transport device can be configured to couple to a vehicle. In this case, the transport device can in this or in any embodiment be a flat bed for a truck. In addition, the container can be in the form of a standard sized container for a standard sized truck such as an eighteen wheel truck.

Inside the container 11 there can be a first holding bin 12 substantially disposed in the container 11. In addition, there can be a second holding bin 14 substantially disposed in the container 11. There can be at least one feed tube 34 coupled to the first holding bin 12. This feed tube 34 is configured to receive material from bin 12 via chute 33 and can include a drive system 29 to feed the material through the feed tube 34. The drive system 29 can be in the form of any known drive system, but in this case can be in the form of a screw drive system. There can be at least one other feed tube 32 coupled to the second holding bin 14, via chute 31, wherein this other feed tube can also comprise a second drive system 27. This type of drive system 27 can be of any known drive system, such as in the form of a screw drive system. These two holding bins 12 and 14 can also each include a vacuum system such as vacuum system 19 or vacuum system 21 which is configured to vacuum up additional particulate matter that has not yet settled.

There can be at least one pre-mixer 42 configured to receive materials from at least one of the feed tubes 32 and 34. The pre-mixer 42 has an input configured to receive an output of the feed tubes 32 and 34 of the first holding bin 12 or the second holding bin 14. This pre-mixer 42 can also be coupled to a weight scale 24 and/or 26 which is configured to weigh the individual inputs of material such as a first type of material and a second type of material. With this design, the pre-mixer 42 is loaded by first inserting a first type of material, weighing this material individually in the pre-mixer 42 to set a second starting weight and then mixing the second type of material into the pre-mixer 42. The loading of this second type of material is tracked so that it matches the pre-determined amount or ratio to create a proper solution. Once the ratios are matched in this pre-mixed batch the mixer or drive 40 mixes this batch before dispensing it through a door 42a to the container of continuous mixer 44.

Continuous mixer 44 is configured to receive an output of the pre-mixer 42 and configured to hold the components from the pre-mixer 42. These mixing elements 45 of this pre-mixer can comprise paddles which can be turned to mix the components in the pre-mixer. Alternative mixing elements can be in the form of a screw drive. Continuous mixer 44 is configured to be larger than pre-mixer 42 so that multiple hatches of pre-mixer 42 can be inserted into continuous mixer 44. In at least one embodiment, the continuous mixer 44 can be sized by volume to be up to five times larger than pre-mixer 42. In that way there can be a simultaneous batch to continuous mixing process. Thus, multiple batches are transported from mixer 42 into continuous mixer 44 so that the system keeps moving forward to continuously mix multiple batches in continuous mixer 44. At this position in continuous mixer 44 there is still no water added to the system. Mixer 44 also includes a high level sensor 44a, a medium level sensor 44b and a low level sensor 44c to determine whether to add additional batches from pre-mixer 42 into continuous mixer 44. High level sensor 44a, medium level sensor 44b and low level sensor 44c are in communication with a computer or control panel (see FIG. 3) so that the level that this mix is set is communicated to the control panel. Flow rates into each pre-mixer 42 can then be controlled so that the flow up feed tubes 32 and 34 can be controlled to inject the appropriate amount of material at the appropriate pace.

In at least one embodiment, the transport device comprises a flat bed 71 with a connection element 60 configured to connect to the vehicle and wherein this vehicle comprises a motor vehicle.

This continuous mixer 44 further comprises mixing elements 45. These mixing elements 45 of this continuous mixer 44 can comprise paddles and/or screws.

Located below mixer 44 is another mixing bin 47 having a drive 46 which and drives the material into distribution devices 48 and 50.

Distribution devices 48 and 50 are each driven by respective pumps or drives 52 and 51 which thereby pump material out from the system. In at least one embodiment, the dry material is mixed with water in mixing bin 47. Therefore, mixing bin 47 is configured to receive fluid material. The dry material which is first mixed in batches in continuous mixer 44 is then dumped into mixing bin 47 to be wet mixed with fluid such as water. Once this material is mixed, it is then fed into distribution devices 48 and 50 for further distribution.

Alternatively, the fluid material can be fed directly into distribution devices 48 and 50 so that the fluid material such as water or chilled water is only mixed with the dry material at a last stage in the process before it is distributed.

In addition, there is a generator 54 which is configured to provide power to the components such as to control panel 100 as well as to the rest of the components. Furthermore for each bin 12 or 14 there are air filters or air handlers which can be HEPA type air filters or air handlers which pull particulate matter from bins 12 or 14 to reduce the environmental issues associated with filling bins 12 and 14 with material.

For example, as shown there is air handler 55 which comprises an air pump which draws particulate material through channel or tube 56 from bin 14 and filters this material. The particulate matter can then be stored and saved and recycled back into the system, such as back into bin 14.

Similarly, bin 12 also has an air handler 57 which includes a tube 58 which draws particulate matter out of the system and stores this system in the body of the air handler. This particulate material can be recycled back into the system such as back into bin 12. With one embodiment, there can be internal water tanks that are chilled, while in another embodiment, there can be external tanks or reservoirs of water that are chilled. For example, FIG. 1 shows a first embodiment wherein there are also at least two internal water tanks 70 and 70.1 as well as a water line 72 which is configured to feed water into either tank 47 or into distribution devices 48 and 50, past flow meter 74 via a water pump 73 which can be controlled by control panel/computer 100. With this design, tank 70.1 can be the reserve chiller tank, tank 70 can be the feed tank and the water flows through water line 72 past flow meter 74 into these distribution devices 48 and 50 or into tank 47.

With the second embodiment, the external chiller 120 is configured to chill the water or fluid in tanks 70.1 and 70 before it is mixed with the material in the distribution devices 48. These water tanks can include water that is either chilled internally to the system or externally to the system.

This system can also comprise at least one scale such as scales 20 and 22 coupled to their respective holding bins 12 and 14. For example, scale 20 is in communication with computer/control panel 100, while scale 22 which is coupled to and configured to weigh holding bin 14 is configured to send the weight of material in holding bin 14 to computer 100. Thus, these scales are in communication with a computerized system 100 (See FIG. 3) to track the weight of material moving through the system.

There can be at least one computer system 100 (See FIG. 3), wherein the computer system is configured to read information from at least one of the scales 20, and 22 and to determine an amount of material fed from at least one of the first holding bin 12 and the second holding bin 14.

The system can also comprise respective first and second air pumps 16 and 18 coupled to each of their respective holding bins 12 and 14. Each of these air pumps pump particulate matter that is stirred up in holding bins 12 and 14 into an additional particulate holding bin such as bins 55 and 57. For example, there is an air pump 16 coupled to the first holding bin 12 and a second air pump 18 coupled to the second holding bin 14. This air pump is configured to pump particulate matter away from at least one of the first holding bin and the second holding bin. Access to these bins is controlled by hydraulic opening devices 28 and 30 which are respectively coupled to bins 14 and 12. These hydraulic opening devices 28 and 30 are each configured to be hydraulically operated pistons. In addition, inside of each holding bin 12 and 14 are respective cutters 15 and 17 having raised arrow shaped blades. Furthermore, coupled to the flat bed 71 is a crane such as crane 79. Crane 79 is configured to load material into the respective bins 12 and 14 while the sacks of material are cut by the respective cutters 15 and 17 when the sacks of material are loaded into the respective bins 12 and 14.

Figure 2:
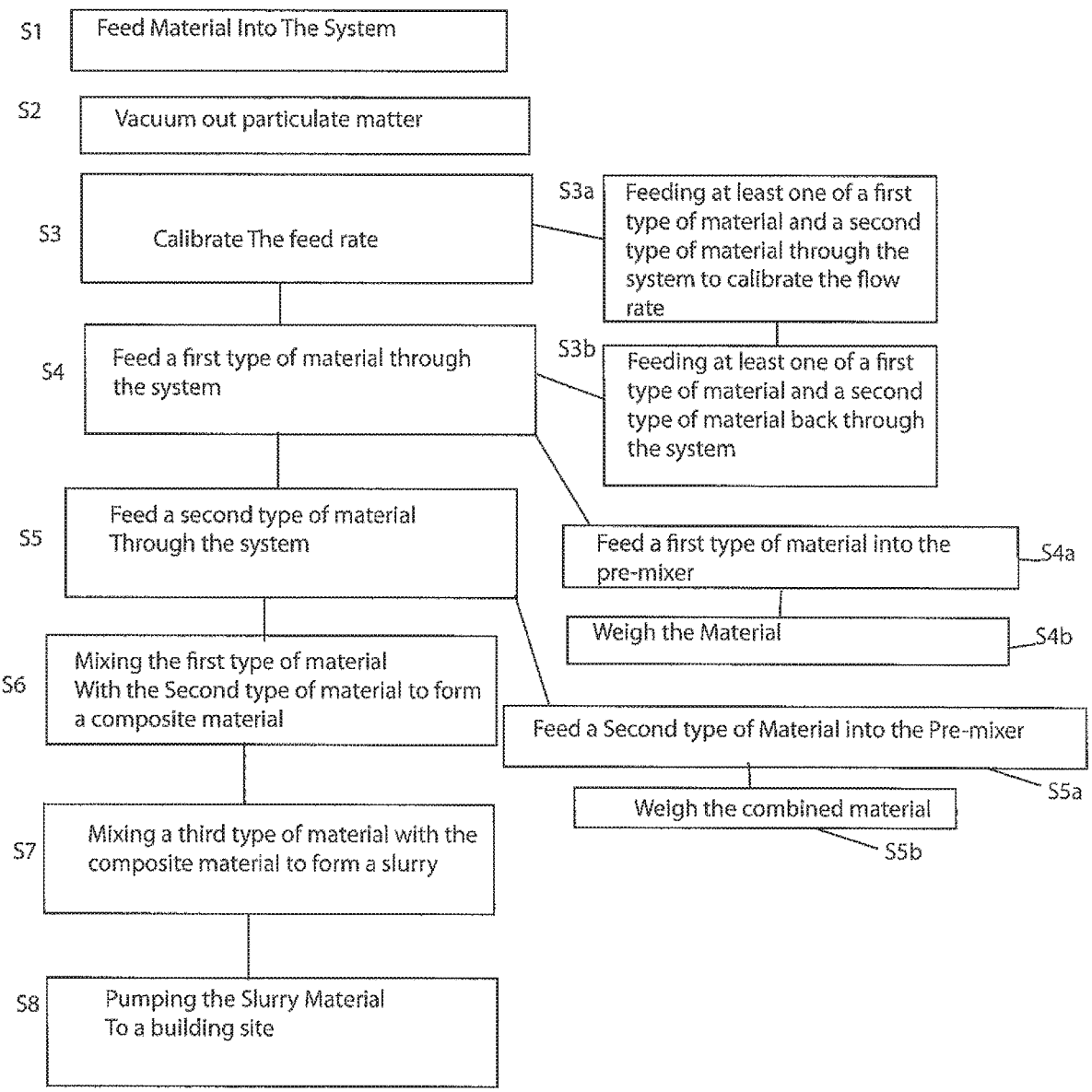
FIG. 2 is a flow chart for the process for mixing and distributing building materials.

As shown in FIG. 2, one embodiment of the invention relates to a process for continuously feeding building materials to a building site.

This process comprises a first step S1 which includes adding material such as sand and binder to the two different holding bins such as holding bin/silo 12 and holding bin/silo 14. Next, in step S2 any particulate material is vacuumed away.

Next, in step S3 the system can calibrate the feed rate of the device. In this step a first type of material such as either sand or binder is fed into the system in limited quantities to test the flow rate or feed rate of at least one portion of the system. For example, if sand is fed into holding bin 14, this sand is then fed through the system into pre-mixer 42, into continuous mixer 44, and into mixing bin 47 to determine the flow rate of this material. Alternatively or in addition, with a second type of run for calibration, different material such as sand or binder can be fed into holding bin 12, and then fed through the system into pre-mixer 42, into continuous mixer 44, and into mixing bin 47 as well. This type of pre-calibration allows the system to determine the actual feed rate for these materials. In at least one embodiment, the step of calibrating the feeding system comprises determining a first weight for a material to be mixed, moving the material through the feeding system, tracking the time for feeding the material through the system and then determining a second weight for the material to be mixed. This process can all be tracked by computer system 100.

Next in step S4 includes feeding a first type of material through a feeding system. This step includes step S4A which includes feeding a first type of material into a pre-mixer. Next the computer system 100 along with weight scales 24 and 26 weigh the input of this material in step S4b. When a predetermined amount is added to the pre-mixer, the pumping of the first material stops. Next, Step S5 includes feeding a second type of material through the feeding system. This step includes step S5a which includes feeding a second type of material into the pre-mixer 42 after the first type of material is fed therein. Next, in step S5B this material is weighed and when the combined weight reaches a predetermined amount, the pumping of this second material is stopped. This process also includes mixing said first type of material with a second type of material into a composite material in step S6 in pre-mixer 42.

Next, in step S7 this dry mixed material is sent as a batch into a holding mixer 44. This holding mixer is capable of storing multiple batches at a single time and also includes a high level sensor 44a, a medium level sensor 44b, and a low level sensor 44c. If the high level sensor 44a indicates that continuous mixer 44 is filled, then pre-mixer 42 holds off from adding additional material to the mix. However, if medium level sensor 44b or low level sensor 44c indicate that the material is getting low in this continuous mixer 44 then the pre-mixer 42 is then instructed to either open a pre-mixing door 42a and dump additionally pre-mixed material into the batch, or to continue mixing until the next batch is ready and then dump the pre-mixed material into the continuous mixer 44.

This process can also include mixing a third type of material with the composite material in step S8. In this process, the mixed batch material is continuously fed into third mixing bin 47 which then results in a third type of material being mixed with the dry mix to create a fluid-type slurry. This third type of material can be a liquid material such as water, a water chemical mixture or any other type of third material.

A next step S9 can include pumping the mixed material to a building site. Because third mixing bin 47 is so small, the previous bin 44 can continuously feed material into bin 47 thereby creating a simultaneous batch-continuous mixing process.

Figure 3:
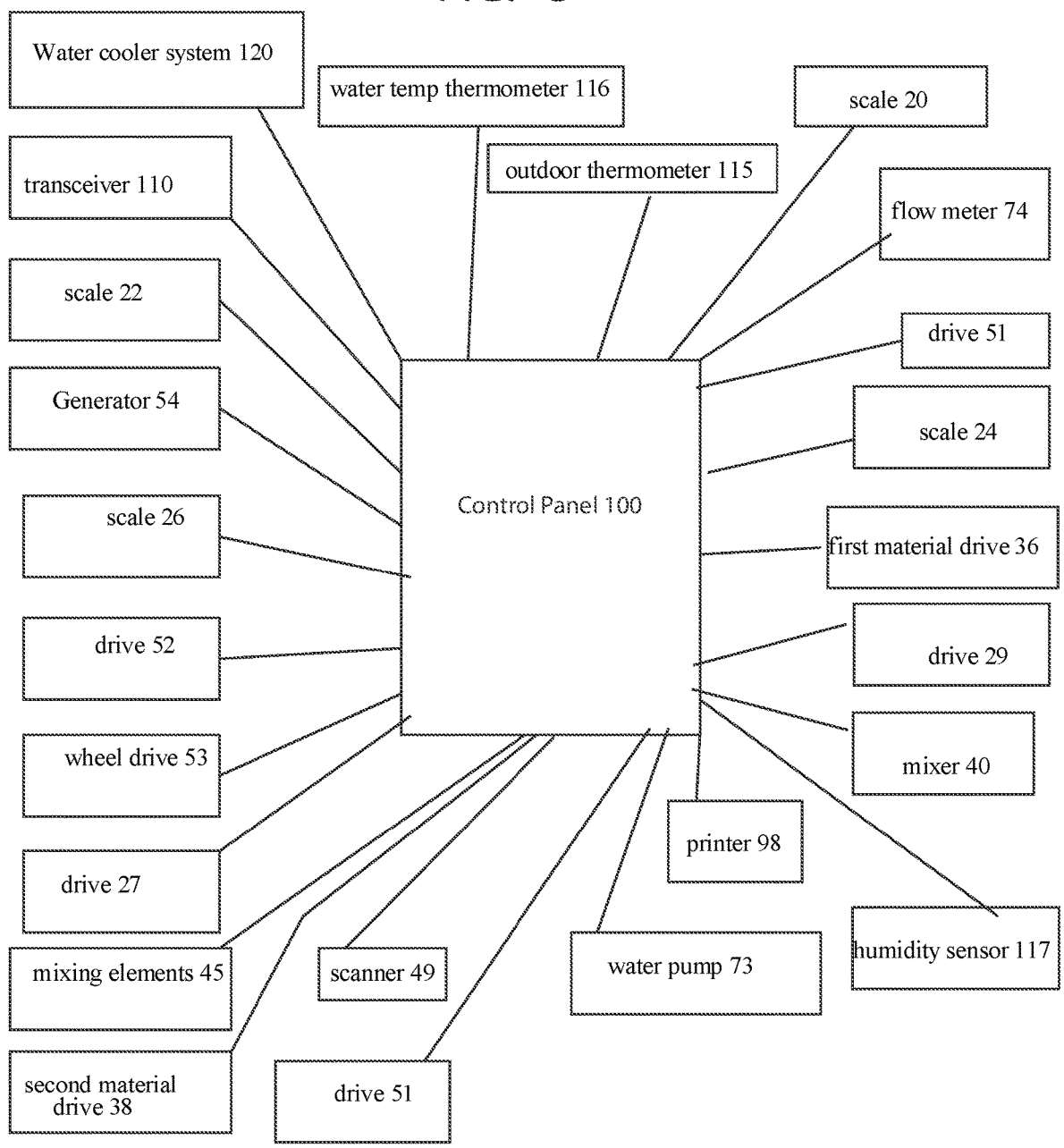
FIG. 3 is a block diagram of a computerized system.

FIG. 3 shows the communication between the computer/control panel 100 and the components of the system which can be controlled by the computer/control panel 100. In this case, there is a direct wireless or wired communication between the remote components and the computer control panel 100. For example scales 20, 22, 24, and 26 are in either wireless or wired communication with computer/control panel 100. This communication allows scales 20, 22, 24 and 26 to communicate the weight that is present within these holding bins 12 and 14 as well as tracking the dynamic weight change that occurs within these holding bins thereby tracking the flow rate of materials from these holding bins. The material is dispersed from these holding bins 12 and 14 via a first material drive 36 for bin 12 and a second material drive 38 for bin 14. These material drives are disposed at a bottom region of bins 12 and 14 (See FIG. 1) such that the material dispensed by bins 12 and 14 is synchronized with the material fed up through feed tubes 32 and 34. Therefore, first material drive 36 is synchronized with drive 29 in feed tube 34, while second material drive 38 is synchronized with second drive 27 in feed tube 32 to allow a continuous and even flow of material up these feed tubes.

In addition, mixer 40 which is associated with pre-mixer 42 as well as mixing elements 45 which is associated with the continuous mixer 44, can all be synchronized by computer 100 to control the flow of material through the system. Door 42a can have a mechanical opening system which is configured to open this door when contacted by computer 100.

Furthermore, material from continuous mixer 44 can be fed by pump, or drive 46 which mixes material in mixing bin 47 and feeds mixed material into distribution devices 48 and 50. High level sensor 44a, medium level sensor 44b and low level sensor 44c are configured to send signals to computer or controller 100 so that computer or controller 100 can decide when to open door 42a to distribute more material from pre mixer 42 into continuous mixer 44 which comprises a mixing bin.

There is also a wireless transceiver 110 which is configured to communicate with other devices such as remote computers or laptop computers which can be used to operate control panel 100.

In addition there are a plurality of different sensors/gauges that are configured to work with water cooler system 120. For example, there is an outdoor thermometer 115 which communicates the outdoor temperature to the control panel 100. There is also a water temperature thermometer 116 which is disposed in at least one embodiment in tank 70 or tank 70.1 which can be in the form of a water tank. The water temperature thermometer 116 and the is configured to send water temperature information to control panel 100 as well. Furthermore, a humidity sensor 117 which is disposed on the truck is also in communication with control panel 100 as well.

Some of the other components connected to computer/control panel 100 are printer 98 which is configured to print statements which reflect the amount of material that is disbursed, the location of the job, the estimate for the job, the actual cost for the job based upon the amount of material disbursed. Computer 100 can also control wheel drive 53 for a hose which can connect to an outside water source. Computer 100 can also be in communication with generator 54, wheel drive 53, water flow meter 74, scanner 49, drive 51, and drive 52 and any other elements shown in FIG. 3. For example, scanner 49 can be in the form of a hand held scanner which communicates wirelessly or an attached scanner which communicates via a cable with computer 100. An example of a wired scanner is shown in FIG. 1. However, in a preferred embodiment, the scanner is a wireless scanner.

Figure 4A:
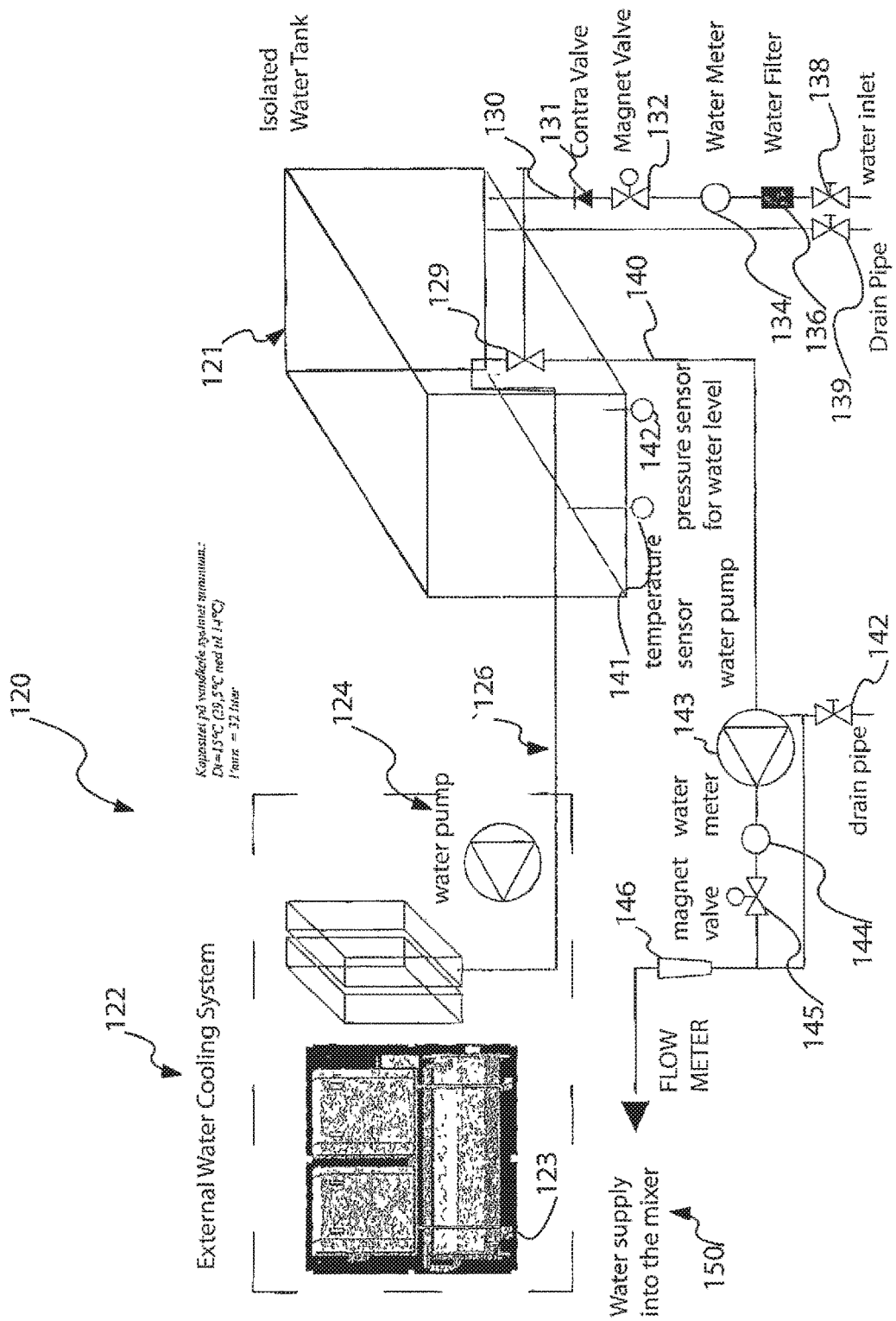
FIG. 4A is a view of an external water cooling system that can also be used to cool the water before it is introduced into the system.

This system can also include an external water cooling system. For example, FIG. 4A discloses an external water cooling system which can either be included with the pump truck or housed on a separate truck. The external water cooling system 120 includes two different sets of tanks including an external water cooling system 122 and isolated water tank 121. Inside of this external water cooling system 120 separate water tanks 122, a chiller or compressor 123 and a water pump 124 to pump the water either into or out of the tank along line 126. Compressor 123 is configured to chili the water down to a desired temperature such as approximately, 15 degrees C., or even as low as 14 degrees C.

The two different sets of tanks 121 and 122 can operate in a similar manner to the two tank system 70 and 70.1 shown in FIG. 1. However tanks 122 function as external water tanks which can be housed outside of the container of the system 10.

A valve 129 is configured to control the release of water along line 140. In addition, water is input into the system via line 130 which allows for an inlet of the water through valve 138, past water filter 136, and water meter 134, through magnet valve 132 and contra valve 131 into the water tanks. Essentially as water enters into pipe 130 it is filtered by water filter 136. The amount of flow is monitored by water meter 134 and this flow is then controlled by valves 132 and 131 into the tanks. Once the water is inside the tanks, the temperature is monitored via temperature sensor 141. In addition, the water level inside of the tanks is monitored via a pressure sensor 142.

Water is dispersed from the tanks via valve 129 which is controlled by the controller in control panel 100. Water then flows along line 140 to ether the drain pipe and out drain valve 147, or along line 140 and to water pump 143 which continues to pump the water to water meter 144, past magnet valve 145, and flow meter 146 and out to the water supply 150 for the mixing bin 47 or distribution devices 48 and 50. The magnet valve 145 can be controlled by the controller so that if the flow meter 146 detects that too much water has flowed, or the water meter 144 detects that the water pressure is too high, then magnet valve 145 can be closed.

This water cooling system 120 can be used to chill the water before it is introduced into the mixer to slow the reaction time of the building materials being mixed in the mixing bin 47 or the distribution devices 48 and 50 and to control the temperature of the water introduced into the mixture so that the mixture of building materials and water have a substantially uniform reaction time once the material is mixed and then subsequently poured.

Some of this water can also be selectively drained from the system via valve 139 which allows water to flow out of the system and into a drain pipe as well.

Thus, there is a system which is a computer controlled system wherein once the drives are synchronized for each set of material, the system can operate on a continuous flow system wherein this material is simultaneously batch mixed as well as continuously mixed.

Figure 4B:
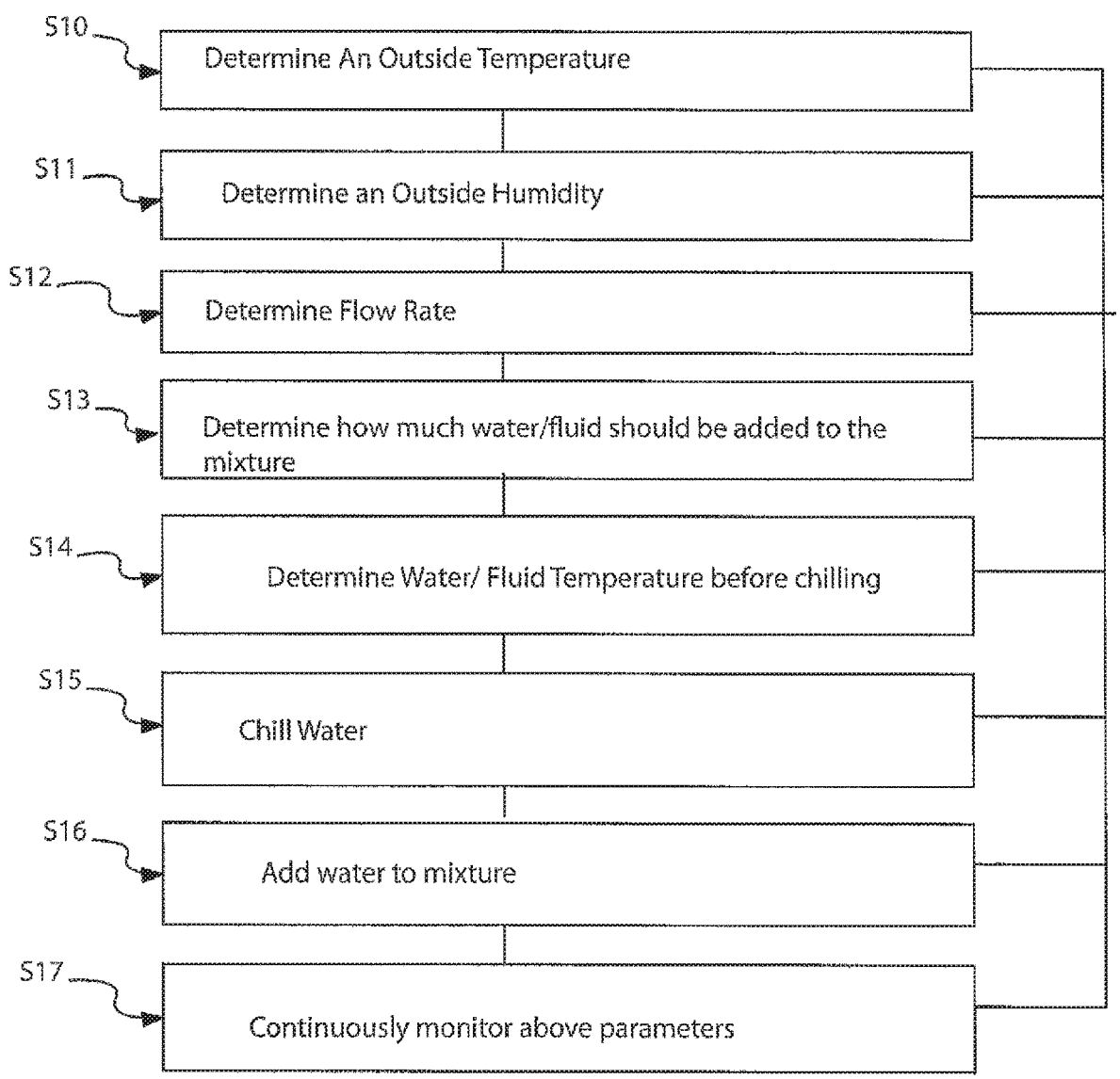
FIG. 4B is a process for chilling or cooling the liquid/water before adding it to the mixture.

FIG. 4B shows a process for cooling the fluid or water before it is mixed with the additional materials. For example, in step S10 the system determines the outside temperature with outdoor thermometer 115. Next, in step S11 the system or control panel 100 determines the outside humidity. Humidity is an important factor because it can be used to determine how much water should be added to the mixture. Hot and humid days may result in different amounts of water being added vs. cool and wet clays or hot and dry days or cool and dry days. Therefore, it is helpful if control panel 100 can determine the temperature of the outside air as well as the humidity in the air before starting the process.

Next, in step S12 the control panel 100 or system determines the flow rate of the dry material in the system. In at least one embodiment, the flow rate of the material can be predetermined beforehand so this step can be already set before the process even starts.

Once the flow rate of the dry material is determined then the system in step S13 determines how much water/fluid should be added to the mixture. In at least one embodiment, the system could be dynamic in that the flow rate can be varied for both the dry material and the wet material. This flow rate can be varied based upon the outside temperature and the outside humidity which is read by control panel 100.

In step S14, control panel 100 determines the water/fluid temperature before chilling the water. Next, in step S15 the system chills the water. By knowing the flow rate of the water and the temperature of the water, the system can work to continuously keep the water cool so that a continuous flow of cool water/fluid is available to mix with the system. In at least one embodiment, this continuous flow of cool water can be set at approximately 50 degrees Fahrenheit (F.), in another embodiment, the temperature could be approximately 55 degrees F., approximately 60 degrees F., approximately 70 degrees F., approximately 75 degrees F., approximately 80 degrees F., or any suitable temperature in between.

In step S16 the water/fluid is added to the mixture to create a wet slurry. Finally in step S17 the system, which is shown by way of example in step S17 continuously monitors the above parameters so that the chiller can adjust its cooling rate to keep the water cool to a suitable temperature.

Figure 5A:
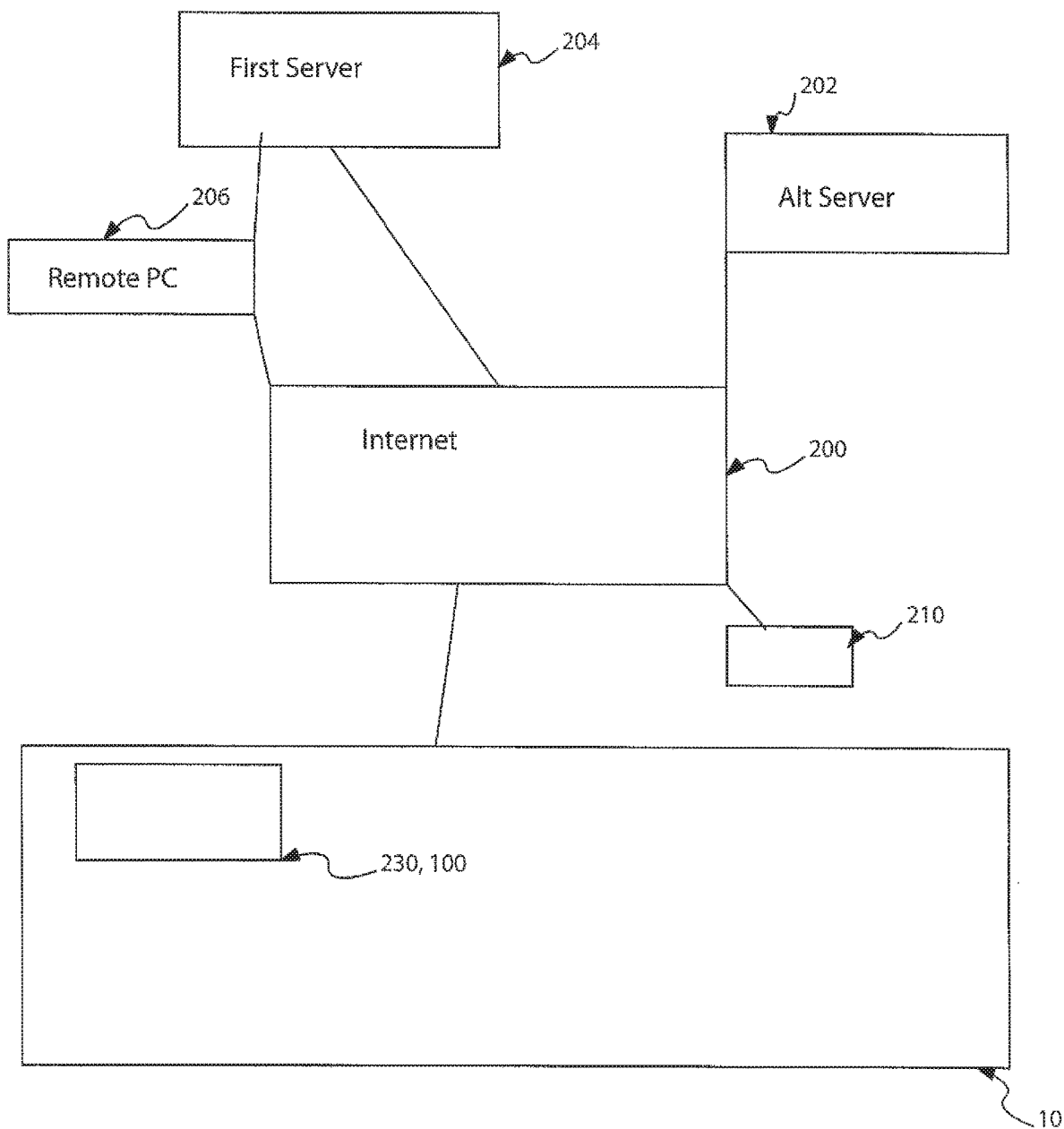
FIG. 5A is a block diagram of a computerized system for monitoring the material used in the system.

There can also be a system for tracking orders used in a continuous, or batch-continuous mixing system. For example, in FIG. 5A is a schematic view of a system for purchasing and for controlling the flow of material through a dispensing system 10. The dispensing system can be in the form of a portable dispensing system such as that shown in FIGS. 1-4. For example, with this system there is a first server 204 which catalogs and controls the identity of packages of goods. In this embodiment this server 204 includes a database which includes a list of the packages of goods and the amount of goods in each package. An alternative server 202 which can be in the form of any additional or auxiliary server can also be connected to server 204. This additional or alternative server 202 can be in the form of an application server, a database server or any other type of suitable server. In addition, there can be a remote pc 206 which is in communication with first server 204 as well as in communication with alternative server 202. This remote pc or computing device 206 can be in communication with these servers 202 and 204 either on an intranet or through the interact 200. Each of these servers 202, 204 or computing device 206 include a processor such as a microprocessor 202a, 204a, 206a respectively, a motherboard 202b, 204b, 206b respectively, and a memory 202c, 204c, 206c respectively, a communication port 202d, 204d, 206d respectively which allows these devices to independently process information via their respective microprocessors, store information their respective memories, and communicate with each other via their respective communication devices. These communication ports, particularly communication port 230d or communication ports 230c and/or 230f can be in communication with transceiver 110 for communication with.

Figure 5B:
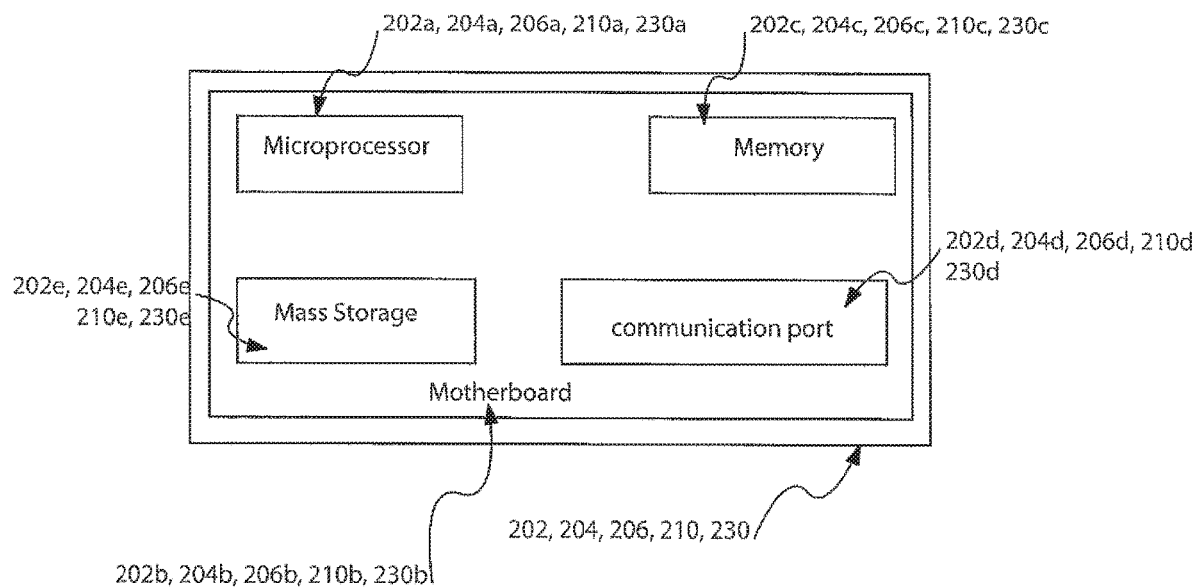
FIG. 5B is a block diagram of the computer devices for monitoring the material used in the system.
Figure 5C:
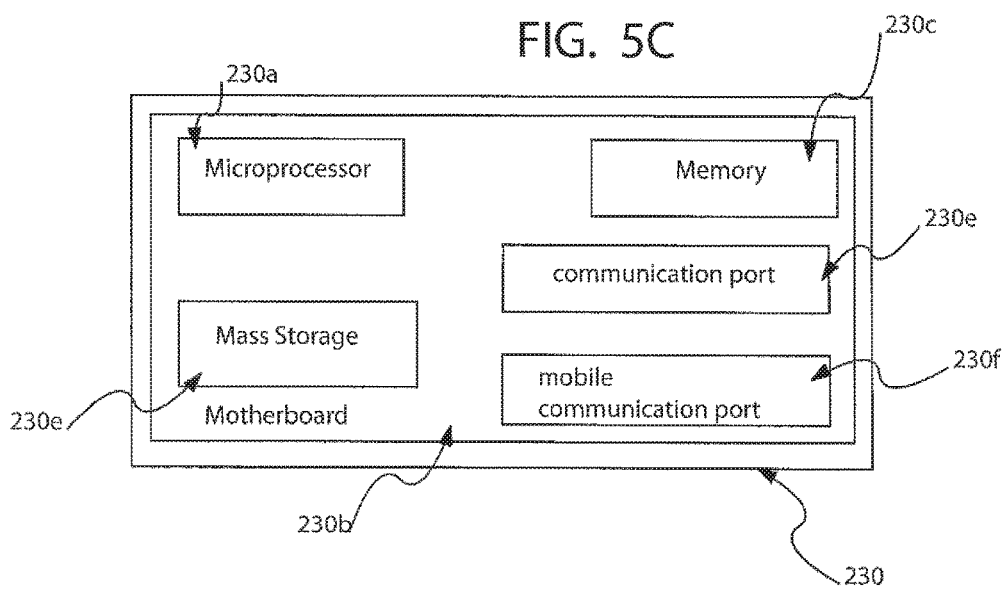
FIG. 5C is a block diagram of the controller having an additional communication port

FIG. 5C shows another version of the computing device such as computing device 230 which includes two different communication ports. For example, there is a communication port 230e which is for WIFI communication. A communication port 230f is a mobile communication port which has a SIM card, CDMA or any other type of cellular communication to wirelessly communicate with the servers.

Each of these devices communicate either together or through a designated server such as through first server 204 or the alternate server 202. Once this information is passed to the internet 200 it is then passed onto either a remote computer or processing device 210 or onto a controller 230 for controlling the dispensing system 10.

The controller 230 can be configured as a computer such as a personal computer having a processor 230a, a motherboard 230b, a memory 230c and a communication port 230d. The communication port 230d can be in the form of a wireless communication port or a wired communication port. In at least one embodiment, this communication port is a wireless communication port having either WIFI (80211.x.) type communication, cellular communication such as 3g, 4g CDMA or any other type of protocol for communication. The information is then communicate between this controller 230 and the Internet 200 and then passed back to server 204 or server 202. Remote computer 210 can also include a microprocessor 210a, a motherboard 210b, a memory 210e, and a communication port 210d where remote computer 210 is configured to communicate through a computer network such as the internet to relay information. From this remote computer 210 a user can purchase product and have the access code sent wirelessly to controller 230. The layout and design of the individual computer components is shown in FIG. 5B. In this view, there is a microprocessor 202a, 204a, 206a, 210a, 230a, for the respective computing devices 202, 204, 206, 210, 230, a motherboard 202b, 204b, 206b, 210b, 230b, memory 202c, 204c, 206c, 210e, and 230c, a communication port 202d, 204d, 206d, 210d, 230d, and a mass storage which can be in the form of a hard drive 202e, 204e, 206e, 210e, 230e.

FIG. 5C shows the computing device 230 alone which instead of using a single communication port 230d, includes two different types of communication ports 230e and 230f. Communication port 230c is a first type of communication port such as WIFI, or using standard TCP/IP protocols and relying on WIFI hotspots. Communication port 230f is a cellular type communication port which operates using cellular type communication in addition to the WIFI communication or alternative to this WIFI communication.

Figure 6:
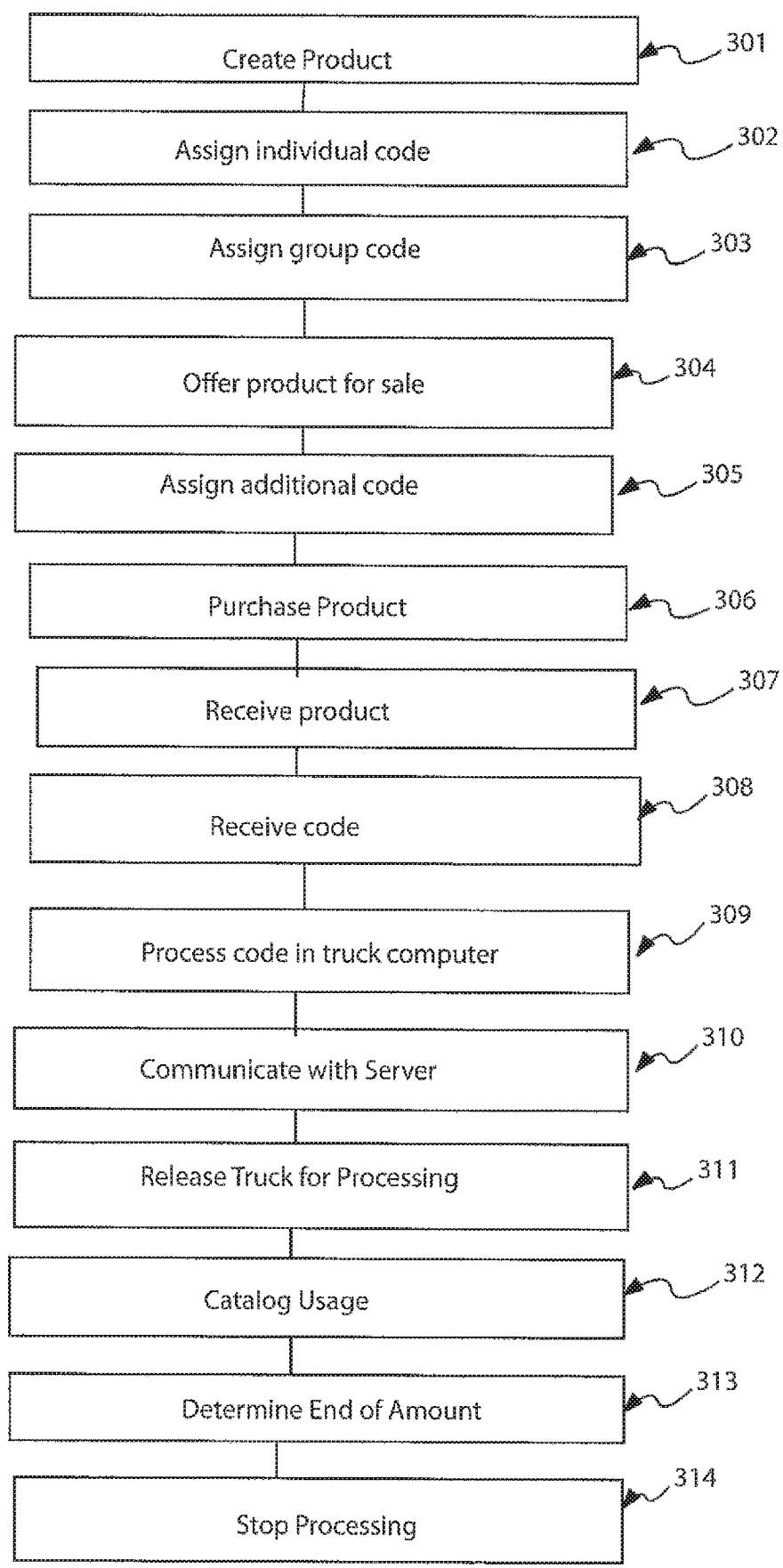
FIG. 6 is a flow chart for the process for determining whether the proper building materials are used in the system and to monitor the amount of materials dispensed from the system.

FIG. 6 is a flow chart for the process for controlling the use of product through a system for delivering building materials such as the system 10.

For example, the process starts in step 301 wherein the producer creates a product in step 301. This product can be in the form of cement or building materials. The cement or building materials can be housed in a container such as a sack. Next, in step 302, the producer can assign an individual code to that container or sack. Alternatively, the producer in step 303 can assign a group code to this container or sack. The group code would then coordinate for multiple containers or sacks. The assignment of these codes and the tracking of these building materials can be done through the use of a first server 204 or an alternative server 202. In this case, the assignment of the code would be performed by a microprocessor 202*a* in server 202 or by microprocessor 204*a* in server 204. Remote computing device 206 can also be used to control the assignment of codes to the product as well. For example a user could log into any one of the servers 202 or 204 and then assign individually these numbers in the form of a manual override. Once the codes are assigned to the product, the system can offer the product for sale in step 304. If the purchase of the product results in a group purchase, the system an also in step 305 supply or provide an additional code for hulk purchases which was not provided before. This code can be in any form of identification code for unlocking the use of the machine.

Next, users who are owners of the system 10 can purchase this product in step 306. The purchase of this product can be through a sales call, where a salesman can initiate the sale of this product over the telephone and then place the order or through a computer generated process as well.

Once the product is purchased, the user can receive the product in step 307. The purchase of this product will allow the user to receive the generated code as well in step 308.

Figure 7:
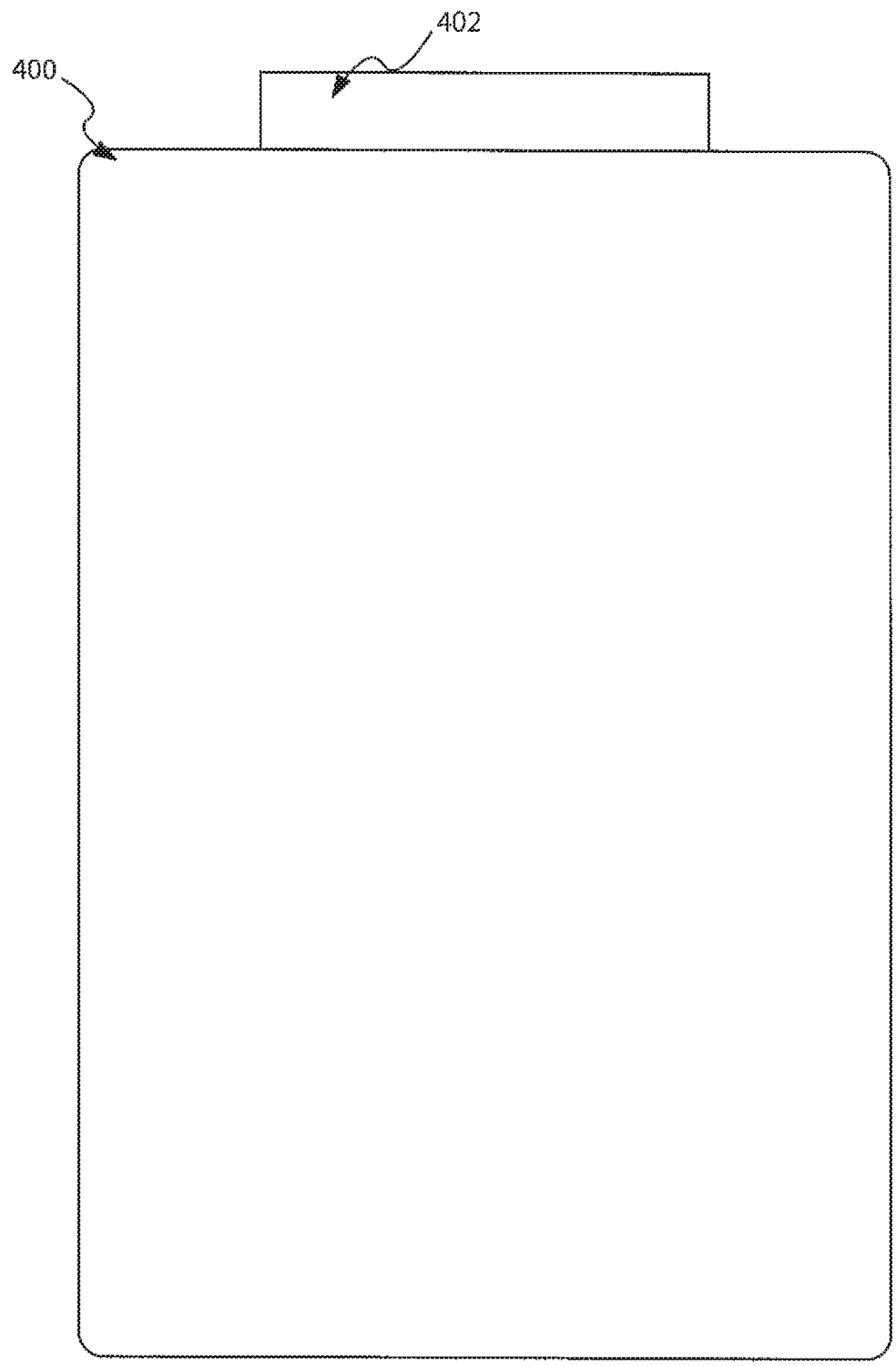
FIG. 7 is a view of a container for the building material.

The product can be processed through the system wherein the product can be loaded into one or more holding bins or containers before delivering the mixed product. These containers can contain a bar code, or RFID code or near field scannable code which allows the computer device 230 to determine whether this is authorized product. For example, as shown in FIG. 7 there is a container 400 in the form of a sack for containing the building materials. This sack can include a scannable tag 402. Scannable tag 402 can include a bar code, either 2d or 3d barcode or a scannable RFID tag which then unlocks the device to operate further. This tag can be scanned by a scanner 49 which can be either a wired scanner or a wireless handheld scanner in communication with controller 230 or computer 100. Essentially controller 230 can include all of the components of computer 100 but also be configured with codes for selectively unlocking the control panel for a limited volume of mixing or for a limited period of time. With computer 100 this feature is optional.

Once the code is processed in the truck in controller or computing device 230 in step 309, then the controller is unlocked to process the material. This unlocking stage can occur via codes already stored in the controller 230 or via the controller 230 communicating with any one of servers 202 and 204 to determine whether this code is an authorized code. Once the truck or system has been released for processing in step 311 it can then process the building materials. This system can also catalog the usage of the materials in step 312 so that it can track the amount of material processed, and the type of material processed including the times and dates of the usage of the material. This information can then be used to create an invoice to customers who are having work performed on their building. The cataloging of this information then can result in determining the end amount in step 313. Once the full amount of material has been processed the system stops processing in step 314. If more codes are added, either through electronic communication (email, database download, text message, etc), or scanning a code on site via scanner 49 then the system can be unlocked again for processing. If during processing, more codes are added, then the volume of material to be disbursed can be increased and the point at which the system is stopped is delayed. Alternatively, this control could be based not on volume but on time as well.

Thus, at this step, the end amount can be continuously re-adjusted based upon either the scanning in of additional tags on containers of building materials, or through the purchase of security codes through wireless communication with a server. This then unlocks at least one mixing step, which can comprise mixing the material in the different mixers such as the pre-mixer 42, the continuous mixer 44, the mixing bin 47, and the distribution devices 48 and 50. Thus this at least one mixing step can include a continuous mixing of material through the system from start to finish until the building materials have been distributed. This information can be cataloged or determined by determining the flow rate of the material through the system and then determining based upon the flow rate of the material, the time for processing the material the entire volume of material being distributed is determined. Once the entire volume of material is determined, and reached, the system can then shut down and stop processing the material.

With these systems such as system 10 the type of material that is used can greatly affect the ability of the system to function properly. Thus, by having a system to lock down the usage of the system unless it is tied to the particular material used would greatly help avoid any possible operating errors or problems with a machine locking up or breaking during operation.

A list of some of the components indicated above is provided below:

10 system
11 container
12 holding bin
14 second holding bin
16 first air pump
18 second air pump
19 vacuum system
20 scale
21 vacuum system
22 scale
24 weight scale
26 weight scale
27 second drive
28 hydraulic opening device
29 drive
30 hydraulic opening device
31 chute
32 feed tube
33 chute
34 feed tube
36 material drive
38 material drive
40 mixer or drive
42 pre-mixer
44 continuous mixer
44*a* high level sensor
44*b* medium level sensor
44*c* low level sensor
45 mixing elements
46 drive
47 mixing bin
48 distribution devices
49 scanner
50 distribution devices
51 pump or drive
52 pump or drive 53 wheel drive for hose
54 generator
55 air extraction bin
56 extraction channel
57 extraction bin
58 extraction channel
60 connection element
70 first water tank
70.1 second water tank
71 flat bed
72 water line
74 flow meter
100 Computer/Control panel
110 Transceiver
115 Outdoor thermometer
116 Water Temperature Thermometer
117 Humidity Sensor
120 Water Cooler System 120
121 isolated water tank
122 External Water Cooling System
123 Chiller or Compressor
124 water pump
126 line
129 valve
131 contra valve
132 magnet valve
134 water meter
136 water filter
138 valve
139 valve
140 line
141 temperature sensor
142 pressure sensor
143 water pump
144 water meter
145 magnet valve
146 flow meter
150 Water supply to mixer
200 internet
202 alternative server
204 first server
206 remote pc
210 remote computing device
230 computer device/similar to computing device 100
400 container [
402 tag Accordingly, while a few embodiments of the present invention have been shown and described, it is to be understood that many changes and modifications may be made thereunto without departing from the spirit and scope of the invention as defined in the appended claims.

What is claimed is:

1. A mobile feeding system comprising:
    a container;
    a transport device coupled to said container, said transport device being configured to be coupled to a vehicle;
        at least two holding bins comprising a first holding bin and a second holding bin substantially disposed in said container;
            at least one feed tube coupled to said first holding bin, and at least one additional feed tube coupled to said second holding bin;
            at least one drive system disposed in said at least one feed tube configured to drive material from a lower region to a higher region,
            at least one additional drive system disposed in said at least one additional feed tube configured to drive material from a lower region to a higher region;
            at least one computer system configured to calibrate and control a feed rate of material from each of said first holding bin and said second holding bin;
        at least one pre-mixer comprising mixing elements and configured to receive an output from said at least one feed tube from said first holding bin and said at least one feed tube from said second holding bin, wherein said at least one pre-mixer is configured to mix the materials in a batch process;
        at least one continuous mixer container, disposed below said at least one pre-mixer, and configured to receive an output of said at least one pre-mixer in a form of a series of batches, wherein said at least one continuous mixer container is larger in volume than said at least one pre-mixer so that said at least one continuous mixer container can receive and store at least two batches from said at least one pre-mixer;
        at least one high level sensor disposed in said at least one continuous mixer container;
        at least one low level sensor disposed in said at least one continuous mixer container wherein said at least one computer system is configured to feed additional batches from said pre-mixer into said at least one continuous mixer container based upon a level of building material in said at least one continuous mixer container;
        a water feed;
        at least one mixer disposed below said continuous mixer container and configured to receive building materials from said at least one continuous mixer container via a gravity feed on a continuous basis wherein said water feed is configured to feed water into said at least one mixer and said at least one mixer is configured to mix material from said continuous mixer and said water together;
        at least one distribution bin, which is fed by said at least one mixer, wherein dry material is mixed with water in said at least one distribution bin, whereby the mixed materials are then fed to a building site wherein the computer system is configured to control the release of material from the continuous mixer container said pre-mixer, said mixer and said at least one distribution bin to form a batch-continuous mixing system.

2. The mobile feeding system as claimed in claim 1, wherein said transport device comprises a flat bed with a connection element configured to connect the flat bed to said vehicle and wherein said vehicle comprises a motor vehicle.

3. The mobile feeding system as claimed in claim 1, wherein said mixing elements of said pre-mixer comprise paddles.

4. The mobile feeding system as claimed in claim 1, wherein said at least one continuous mixer container further comprises mixing elements.

5. The mobile feeding system as claimed in claim 4, wherein said mixing elements of said continuous mixer container comprise paddles.

6. The mobile feeding system as claimed in claim 1, further comprising a at least one scale configured to weigh at least one of said first holding bin and said second holding bin, said at least one scale being configured to weigh material in the holding bin.

7. The mobile feeding system as claimed in claim 6, wherein said computer system being configured to read information from said at least one scale and to determine an amount of material fed from at least one of said holding bin and said second holding bin.

8. The mobile feeding system as claimed in claim 7, further comprising at least one control panel which is configured to control said mixing elements of said pre-mixer and said continuous mixer container, and at least one wireless transceiver, which is configured to communicate with a remote computer, and which allows said remote computer to control said at least one control panel.

9. The mobile feeding system as claimed in claim 1, further comprising an air pump, and a particulate holding bin, said air pump being coupled to at least one of said first holding bin and said second holding bin, said air pump being configured to pump particulate matter away from at least one of said first holding bin and said second holding bin.

10. The mobile feeding system as claimed in claim 9, wherein said air pump comprises a vacuum system which is configured to recycle said particulate matter back into the system.

11. The mobile feeding system as in claim 1, wherein said pre-mixer is disposed below an output of both said at least one feed tube and said at least one additional feed tube.

12. The mobile feeding system as in claim 1, wherein said continuous mixer container is sized to receive up to five batches from said pre-mixer.

\* \* \* \* \*